United States Patent [19]

Torres

[11] Patent Number: 4,826,438

[45] Date of Patent: May 2, 1989

[54] FOLDABLE LEARNING STATION FOR MAKING UP TECHNOLOGICAL OPERATING CIRCUITS

[76] Inventor: Mariano C. Torres, Grupo Legazpi, 5, Zumarraga, Guipuzcoa, Spain

[21] Appl. No.: 181,640

[22] Filed: Apr. 14, 1988

[51] Int. Cl.$^4$ ............................................. G09B 25/02
[52] U.S. Cl. .................................................... 434/219
[58] Field of Search ............... 434/219, 224, 379, 380, 434/389, 401, 108

[56] References Cited

U.S. PATENT DOCUMENTS 4,650,425 3/1987 McGarry ........................... 434/219

Primary Examiner—William H. Grieb
Attorney, Agent, or Firm—Lucas & Just

[57] ABSTRACT

Foldable learning station on which to make up technological (mechanical, electrical, electronic, fluid) operating circuits, having an "L" configuration formed by equal panels hinged together to provide a channeled surface appropriate for clamping, in any of a number of different positions, modular elements which bear the components of the said circuits, and comprising means for rigidly securing the configuration to a horizontal base.

13 Claims, 4 Drawing Sheets

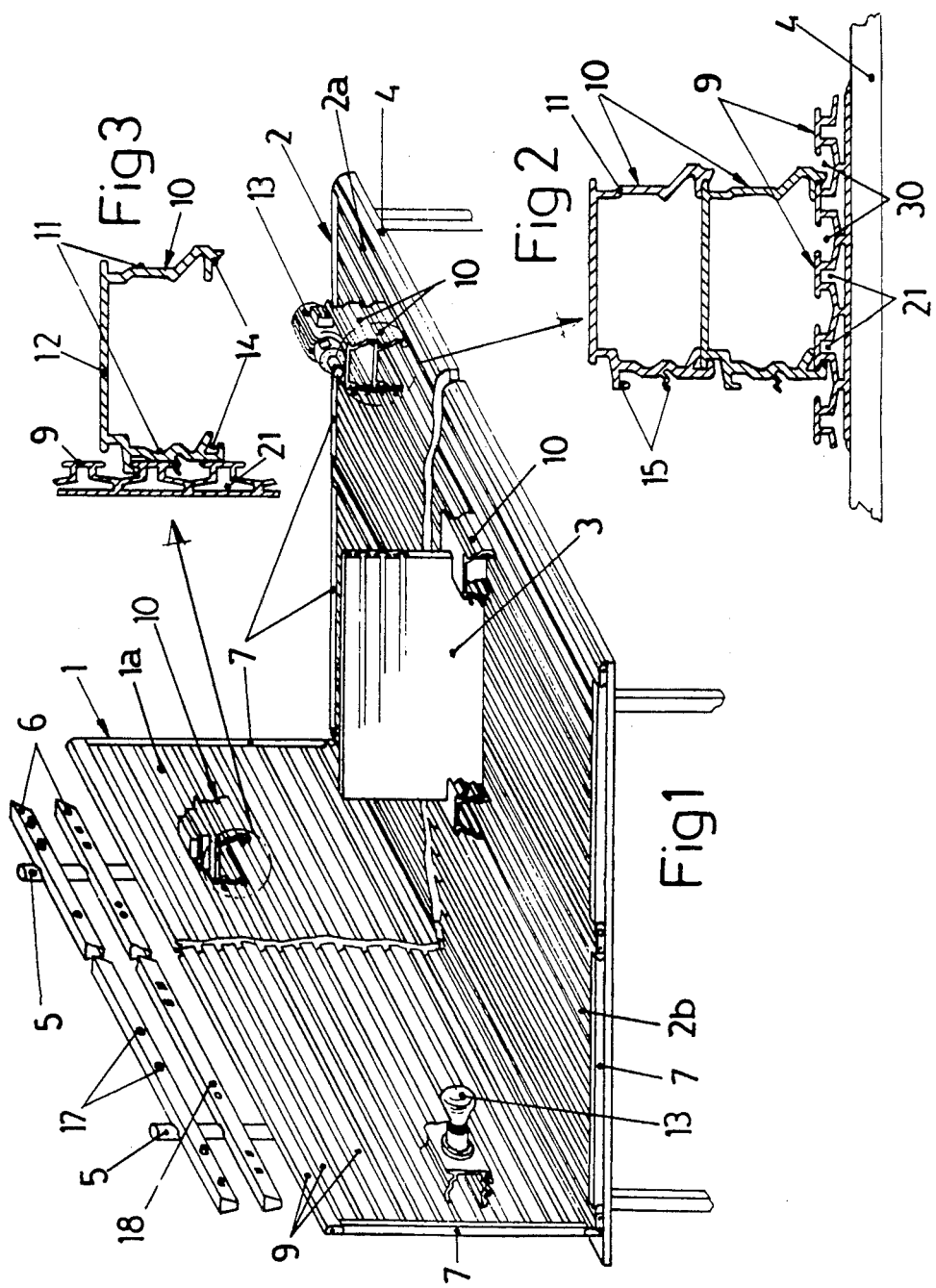

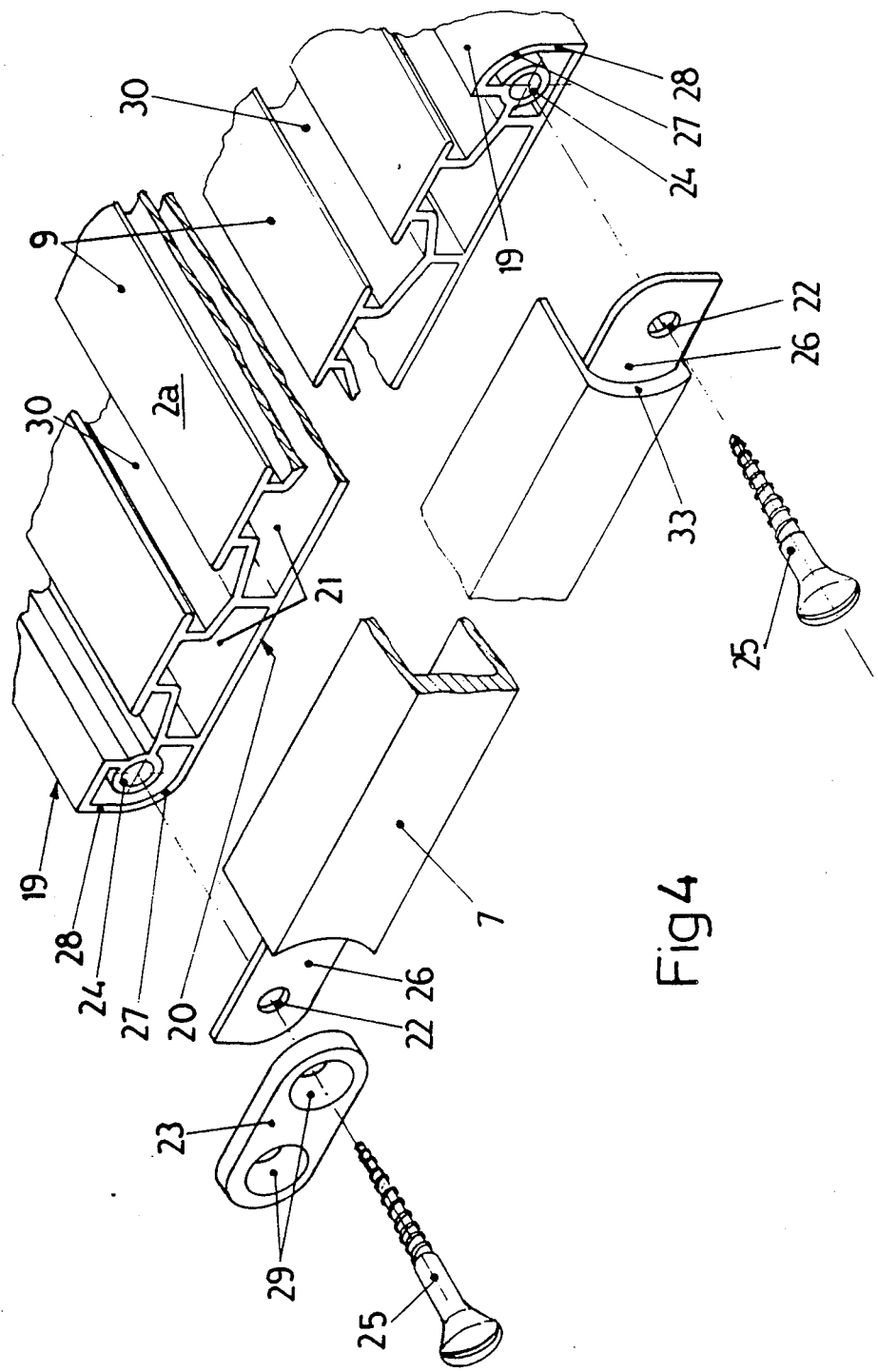

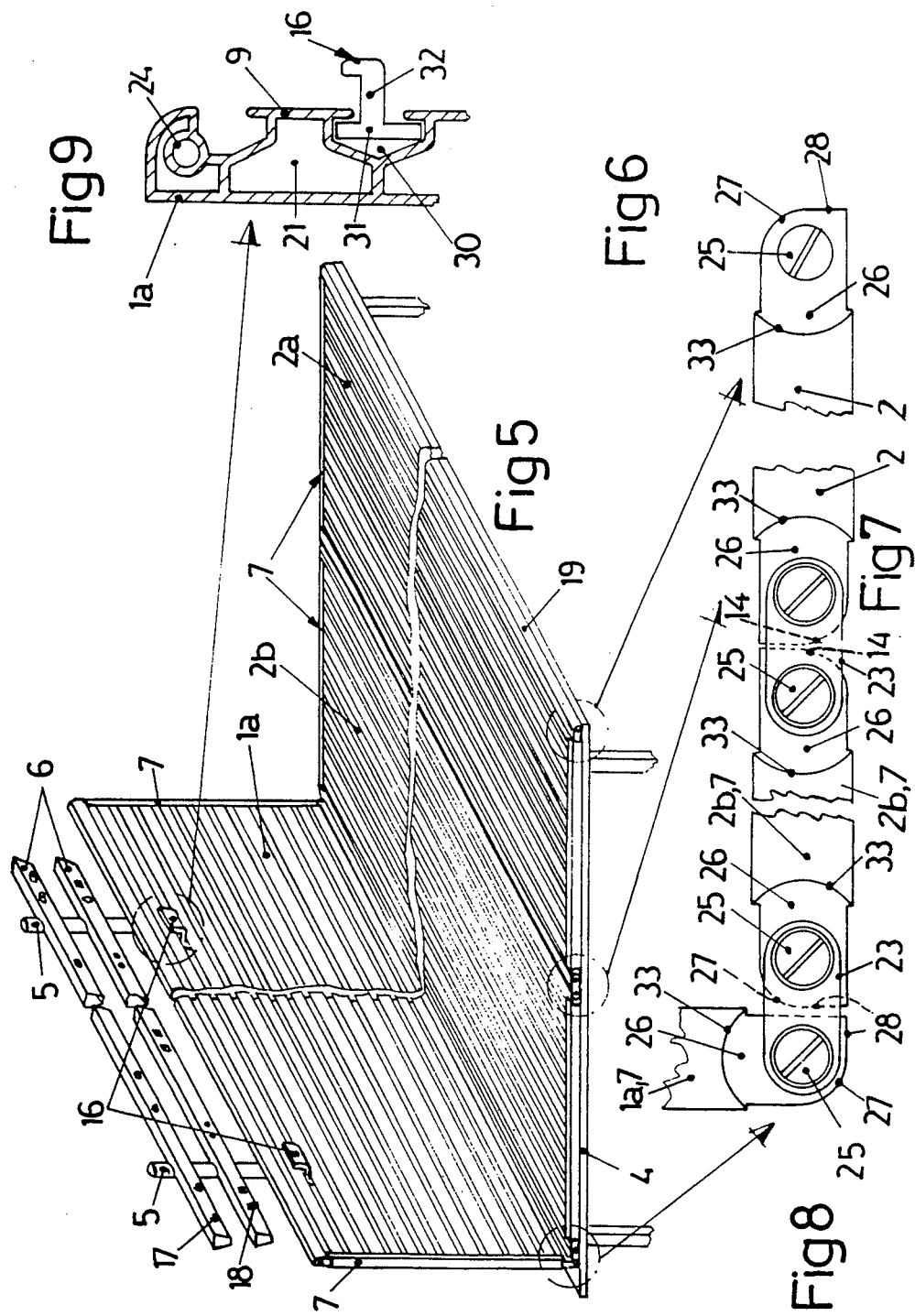

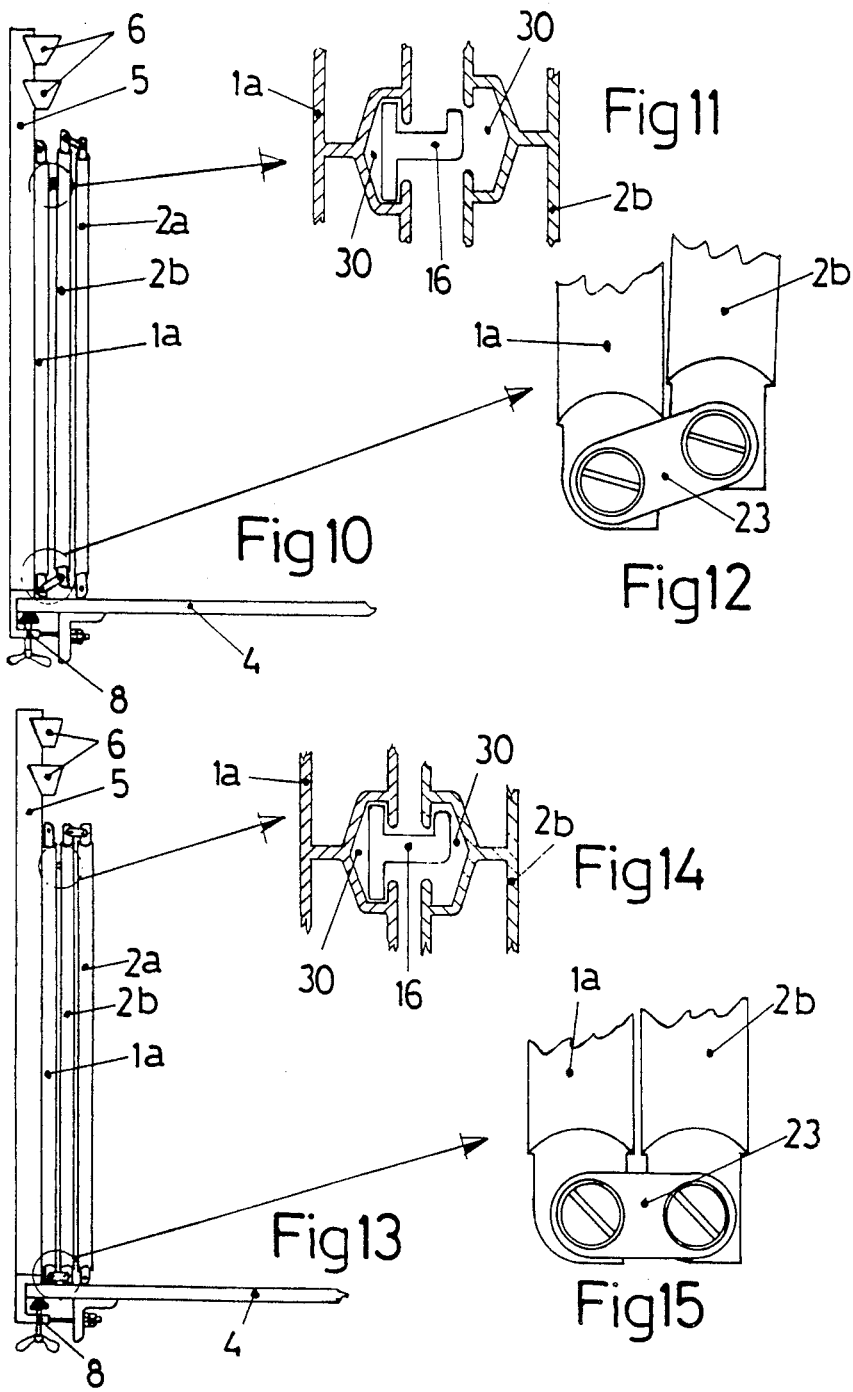

4,826,438

FOLDABLE LEARNING STATION FOR MAKING UP TECHNOLOGICAL OPERATING CIRCUITS

FIELD OF THE INVENTION

The present invention relates to the installation of laboratories for the teaching of disciplines such as electricity, electronics, mechanics and fluid dynamics, "learning station" being understood in this context to mean the work place which is intended to be occupied by a student and on which there will be placed the means necessary in each case for carrying out various training work.

The teaching of these laboratory disciplines shall take place with the building of more or less complicated circuits which we shall refer to as "technological operating circuits."

The object of this invention is a learning station which is intended to facilitate the composition of technological operating circuits and offers great simplicity and speed in setting up, together with a high degree of transportability.

STATE OF THE PRIOR ART

Within the field of the invention, what is done at present is to put in place work tables of suitable configuration and dimensions on which the apparatus necessary in each case is placed and the circuits under study are also configured.

For the configuration of circuits, there are known devices consisting in generating an assembly base for such circuits resting on the horizontal plane of the work table, the assembly base being formed by being put together in the manner of a puzzle of small modular regions. Such as assembly base has prismatic projections with respect to which there are assembled prismatic modules open at the bottom which bear parts and components of the circuit to be made.

These devices require considerable work in order to assemble and disassemble the circuit assembly base and, once the said base has been dismantled, the numerous modular regions which make it up must be collected and stored. This turns out to be fairly troublesome and, as a result, a large amount of unproductive time must be spent or, what is more frequent, the assembly bases are not picked up every time, and it commonly happens, as a consequence, that a large part of the useful surface of the laboratory work tables is permanently occupied by these devices, even when no one is working on them; this leads to poor utilization of work stations, the possible and unnecessary piling up of objects at the available work stations and a disorderly appearance of the laboratory, which is always ill-advised and particularly so within a learning environment.

Furthermore, the process of formation of the assembly base does not make it possible to establish vertical work planes for constituting circuits, so that the prismatic modules can be assembled only in a single manner with respect to the horizontal assembly base, which is a limitation with respect to obtaining the greatest possible number of configurations of technological operating circuits.

EXPLANATION OF THE INVENTION AND ADVANTAGES

The present invention relates to a learning station for making up technological operating circuit which exhibits the special feature that it comprises an L-shaped structure of vertical and horizontal work planes each made up of equal panels united with hinging means that make it possible to fold the whole by folding each panel against the adjacent one, whose vertical plane has, placed against it, at least two tubular rear posts united at the top by hollow longitudinal members and with means at the bottom for securing the posts with respect to a horizontal supporting base for the horizontal work plane in such a way that as a whole the posts and the horizontal base make it possible to fix rigidly the L-shaped configuration; and whose panels have work surfaces channeled throughout, which determine hooking strips to make it possible to mount modular "bridge" supports which have a transverse plate that serves in turn as a support for components such as motors, valves, resistors and the like, destined to make up technological operating circuits of the mechanical, electrical, electronic or fluid type; the U-pieces of the bridge supports, for their part, have hooking means at the bottom and sides which enable the supports to be assembled at will either individually or in stacks on the work planes and with their transverse plates oriented horizontally or vertically; and there also exist auxiliary panels which can be mounted between two supports; all of which provides a foldable and transportable learning station which, in order to be installed, requires only a horizontal base and which permits of a multitude of possible configurations for the said technological operating circuits.

In accordance with the invention, each of the grooved panels consists of a parallel surface of T-shaped structural members which are the same, uniformaly separated and united together at their base; the upper crosspieces of the T-shaped structural members constitute the hooking strips whose longitudinal edges project over the channels separating them, and the said T-shaped structural members have hollow shafts that are widened at their base, where they are united to the adjacent T-shaped structural members.

With respect to hinging means, the invention has a characteristic constitution consisting in the fact that, in relation to the position of the user, the two front edges of each panel are closed and have cross sections that configure symmetrical rounded areas, while on the two open lateral edges of each panel there exist corresponding edge covers which have at their extremities orifices that face corresponding sockets provided in the cross section of the panel concentrically with the corresponding symmetricl rounded area, which orifices and sockets cooperate with an equal number of screws, there being lateral articulation members having a pair of holes separated by a distance slightly greater than the diameter of the said symmetrical rounded area, in order to accommodate, in each of the said holes, a joining screw for two separate panels. By virtue of this constitution, once the learning station is set up, the interior of the panels is totally closed, which prevents dust and dirt from gaining access to and accumulating inside them, and, on the other hand, the articulation of the panels by means of members supported on the lateral edges provides the assembly with a degree of structural rigidity that makes it unnecessary to use any other auxiliary means for that purpose.

Another characteristic of the invention consists in the fact that there exist hooks made up of a sliding plate, which is capable of sliding along the channel between two contiguous hooking strips, and of a bent arm that arises from the said sliding plate and passes between the edges of the said two contiguous strips, in such a way that its extremity abuts on the edge of one of the said hooking strips, so that if on a panel in the vertical position hooks are placed with their bent arms pointing upward, another panel, folded with its active side against the first, will remain hooked to the latter on a corresponding strip if the second panel is subjected to a simple first ascending movement and then a movement of approach to the first panel, so that as the said second panel descends, hooking will take place and will keep the two panels united until the opposite maneuver is made, such maneuvers being made possible by the play of which the lateral articulation members are capable. This characteristic makes it possible, as we shall see in detail further on, for the folded position of the learning station to be maintained by mechanical means, so that freeing it in order to extend it afresh requires a voluntary maneuver on the part of the user.

As can be seen from the description given above, the present invention exhibits, with respect to the prior art, advantageous features of great importance, the chief among them being the following:

Foldability, by means of simple, rapid operations which, on the one hand, eliminate unproductive time for assembling and disassembling the assembly base and, on the other hand, make it possible to keep the station folded on the work table and unfold it whenever necessary and vice versa, thus making it easy to keep an orderly laboratory; and even when it is not folded in its own work station, it is nevertheless perfectly tidy, so that one can dispense with storage means for putting it away;

Transportability, inasmuch as, when it is in the folded condition, it suffices to insert the panels with their posts and longitudinal members in a suitable case or simply to have conventional fastening and hanging means in order to transport them;

Possibility of making vertical planes on which to build technological operating circuits;

Possibility of two assembly positions of the modular supports with respect to the panels which now constitute the assembly base, a feature which, combined with the possibility of disposing panels of the latter both horizontally and vertically and the possibility of stacking the modular supports, makes it possible, with only two parts, to obtain the most varied technological operating circuit configurations, this being of particular interest when one is trying to make mechanical connections between elements situated at a specified height or in differently oriented planes;

Ease of adaptation, in terms of size, to the work table, by means of simple hinging, whereby the number of panels can be simply and rapidly increased or decreased;

Possibility of use in already installed learning laboratories.

In accordance with these characteristics of the invention it is provided that the longitudinal members have fluid intakes and electrical outlets conveniently placed for feeding the circuits to be make up on the station, and the corresponding lines can be passed through the interior of the hollow longitudinal members and tubular posts, all of which endows the invention with the following advantages:

Great functional autonomy, due to the fact that it can be installed without any further requirements than a horizontal surface and that it incorporates its own means for electrical and fluid taps for supplying the circuits;

The possibility, in accordance with the relevant regulations, to conduct the said electrical and fluid supply lines separately through the posts and longitudinal members.

What is more, it must be stressed that the modular bridge supports represent a substantial savings of material in that what is used for hooking them is merely two lateral walls, in contrast to the prismatic modules of the known devices, which, owing simply to their manner of assembly, require the use of four lateral walls.

One must also emphasize the simplicity, rapidity and firmness of the assembly of the modular supports, for which purpose the bottom hooking means of the bridge supports are characterized in that the U-pieces enable them to be mounted with a certain elastic play in the distance separating them, and at their extremities these U-pieces have linking concavities facing each other, within which it is possible to fit a plate of another support or a number of hooking strips, the said linking concavities being delimited between pairs of internal projections which prevent passage within the U-pieces, and of these projections the more external ones can be separated by the elastic play of the U-pieces, while the other, more internal projections act as stops to block penetration once linking in the said concavities has been achieved; while the lateral means of hooking, on the other hand, consist in having on at least one of the sides of the U-pieces longitudinal outward projections between which hooking strips can be fitted, there also existing between these projections a certain elastic play which has to be overcome in order to achieve hooking and unhooking.

In the preferred embodiment which will be set forth in detail hereinafter, the front edges have profiles symmetrical to one another with an amplitude equivalent to half the width of a hooking strip, and each of the said symmetrical profiles is constituted by a straight portion lying at right angles to one of the flat faces of the panel and by another, arched circular portion which is tangent both to the said straight portion and to the other face of the said panel; these are arranged in such a way that, between two mutually articulated panels, at least one of the said panels shall have its arched portion facing in the direction in which the folding of the station has to take place and that, when the two articulated panels belong to the same work plane, their union is effected in such a manner that their front edges end up with the straight portions on top and facing each other, so that on the work surface the two terminal half-strips of both front edges are juxtaposed, producing the esthetic effect of continuity of the channeled surface.

When this esthetic effect of continuity is not important, the frontal edges may be perfectly semicircular in section, and this constitutes another of the preferred embodiments of the invention.

DRAWINGS AND REFERENCES

In order to make the nature of the invention more clearly understandable, we have represented in the attached drawings a preferred industrial embodiment, given as an example merely for the sake of illustration and without limitation.

FIG. 1 is a perspective view of a preferred embodiment of the invention in which are illustrated various possibilities of assembly of the modular bridge supports (10), holding circuit components (13) and an auxiliary panel (3).

FIG. 2 is an enlarged view of the detail of FIG. 1, representing in elevation two supports (10) stacked on a panel (2a), the component (13) having been removed.

FIG. 3 is an enlarged view of the detail of FIG. 1 representing in elevation a support (10) assembled on a panel (1a) by means of the lateral outward projections (15).

FIG. 4 shows in perspective and in their relative positions of assembly the various elements which go into the constitution of each panel in accordance with the invention.

FIG. 5 represents in perspective the learning station of FIG. 1, but now without any support (10) mounted on it and showing the hooks (16) as well as a number of circled details given in enlargements in FIGS. 6, 7, 8 and 9.

FIGS. 6, 7 and 8 are enlarged views of the circled details in FIG. 5 which, in lateral front view [sic], correspond respectively to the free front edge (19) of the horizontal end panel (2a); the articulation between the end (2a) and intermediate (2b) horizontal panels, and the articulation between the intermediate horizontal panel (2b) and the vertical panel (1a).

FIG. 9 is an enlarged view corresponding to the circled detail in FIG. 5 and shows in cross section a hook (16) in a channel (30) of the vertical panel (1a).

FIGS. 10 to 15 illustrate the maneuver of hooking the intermediate panel (2b) with respect to the hooks (16) of the vertical panel (1a). FIGS. 10, 11 and 12 illustrate the situation at the end of the ascending movement of the intermediate panel (2b). FIGS. 13, 14 and 15 illustrate the final hooking position. These figures contain the following references:

1. Vertical work plane
1a. Vertical panel
2. Horizontal work plane
2a. Horizontal end panel
2b. Horizontal intermediate panel
3. Auxiliary panel
4. Horizontal base or table
5. Tubular post
6. Hollow longitudinal member
7. Edge covers
8. Fastening means
9. Hooking strip
10. Modular bridge support
11. U-piece of support (10)
12. Transverse plate of support (10)
13. Circuit component
14. Linking concavities
15. Outward projections
16. Hook
17. Fluid inlet
18. Electrical outlet
19. Front edge
20. Lateral edge
21. Hollow shaft
22. Orifices of edge covers
23. Articulation member or plate
24. Fastening socket
25. Screw
26. Fastening end
27. Arched portion of front edge (19)
28. Straight portion of front edge (19)
29. Holes in the plate (23)
30. Channel
31. Sliding plate of hook (16)
32. Bent arm of hook (16)
33. Step member of edge cover (7)

DESCRIPTION OF A DETAILED EMBODIMENT

The drawings show a preferred embodiment of the invention materialized in a foldable learning station installed on a table or horizontal base (4) (FIG. 1), which learning station is constituted by the successive articulation of three identical rectangular panels (one vertical and two horizontal) which, according to their mounting position, are distinguished as: horizontal end panel (2a), which is situated in the position closest to the user; vertical panel (1a), which permanently occupies the vertical position, facing the user; and horizontal intermediate panel (2b), which pivots on the said horizontal end panel (2a) and vertical panel (1a).

As FIG. 1 shows, each panel (1, 2a, 2b) is configured in the guise of a sheet with one flat supporting surface on the table (4) and with another, active, surface which in the direction of its frontal (according to its normal operating position) width has a surface configuration in which channels (30) alternate with hooking strips (9) whose edges project over the said channels (30), all in order to permit the assembly of the modules (10) that support the components (13) of the circuits to be built. This configuration makes it possible for it to be obtained by extrusion of a suitable plastic material which will provide a continuous structural member whose width will have been established as a function of the depth (with respect to the user's operating position) required for each panel (1a, 2a or 2b), the said continuous extruded structural member being cut into longitudinal segments corresponding to the frontal width required for the said panels (1, 2a, 2b). The vertical panel (1a) has at its back two tubular posts (5) which at their bottom (FIG. 10 and 13) have means (8) for fastening to the horizontal base (4) and which protrude above the said vertical panel (1a) for a stretch in which the said posts (5) are united by two hollow longitudinal members (6) on the front of which are separately disposed fluid taps (17) and electrical outlets to provide for the feeding of the technological operating circuits to be constituted.

The work surface of the panels (1, 2a, 2b) has a channeled configuration, as clearly shown by FIGS. 2 and 3, which is made up of T-shaped structural members having hollow shafts (21) widened at their base, as well as crosspieces constituting the hooking strips (9) to which the modular supports (10) can be linked by means of the concavities (14) and the outward projections (15), which modular supports (10) have a bridge-like cross section (FIGS. 2 and 3) with a transverse plate (12) extending out laterally with respect to the U-pieces (11).

The transverse plate (12) is intended to receive the components (13) of the circuits to be constructed, as illustrated in FIG. 1, and the U-pieces (11) for their part provide the linking concavities (14) whereby (FIG. 2) each support (10) can be assembled on the plate (12) of another support (stacking) or on a panel (1, 2a or 2b), in such a way that the support (10) ends up with its plate (12) parallel to the surface of the panel; and at the same time, one of the U-pieces (11) laterally (FIG. 3) has outward projections (15) whereby each support (10) can be assembled on a panel (1, 2a or 2b) in such a way that the plate (12) of the said support (10) is perpendicular to the surface of the panel. Both of the U-pieces (11) and the outward projections (15) permit of elastic play in their mutual separation with a view to facilitating the operation of hooking and contributing to its firmness.

FIG. 1, which illustrates various possibilities of assembly, shows supports (10) fastened to the vertical panel (1a) in the two possible manners, i.e., by means of the concavities (14) of the outward projections (15), consequently causing the plate to be situated vertically, and horizontally, respectively. On the horizontal panels (2a, 2b) two supports (10) are shown stacked, the lower support (10) being assembled in the panel (2a) and the upper support (10) bearing a circuit component (13); on these horizontal panels (2a, 2b) no support (10) has been represented assembled by means of the outward projections (15) but this solution is obvious and in it the plate (12) of the support in question will be oriented vertically. On the horizontal panels (2a, 2b) there is also shown an auxiliary panel (3) held up between two supports (10) in which there has previously been made a transverse notch or slot suitable for accommodating the edge of the said auxiliary panel (3).

With this setup it will be grasped that it is indeed possible to position the components (13) of the circuit to be built with any orientation and at any height in relation to the horizontal (2) and vertical (1) work planes, and the said circuits can be supplied with energy via the outlets (17) and (18) built into the learning station itself.

The front edges (19) of each panel (1, 2a, 2b) have closure wall whose cross section will exhibit some rounded portion to facilitate the relative movement of articulation with respect to the other panel (1, 2a, 2b), in such a way that the transverse profile of the said section may be semicircular or another distinct shape, including that of a straight bevel, provided that it performs the specified function. In the drawings a preferred embodiment has been shown in which the said profile has the width of a half-strip and is formed by the succession of the straight portion (28), perpendicular to one face of the panel (1, 2a or 2b), and the arched portion (27), which covers a quarter circle and is tangent to the straight portion (28) and the other face of the panel (1, 2a or 2b), the said profiles on the two front edges (19) of a given panel being configured symmetrically inverted with respect to one another. The advantage of this configuration is that when the coplanar union of the panels takes place (2a and 2b, for example) (FIG. 7), the two edge half-strips coincide on the work surface, producing the appreciable esthetic effect of simulating uninterrupted continuity of the channeled work surface.

As clearly illustrated in FIG. 4, the two lateral edges (20) of each panel are closed off by the appropriate number of edge covers (7) with fastening ends (26) provided with orifices (22) whereby, with the help of screws (25), the edge covers (7) are fastened with respect to the sockets (24) provided in the corresponding lateral edge (20) of the panel (1, 2a, 2b) in a concentric position with respect to the circular arched portion (27), given that the said screws (25) also constitute the axis of rotation of the said panels when they are folded during the folding of the station. The preferred configuration of the edge covers (7) exhibits a central C-shaped body whose lateral wall has a thickness appreciably greater than the upper and lower wings; this central body accommodates all the hooking strips (9) of each panel (1, 2a, 2b) and, after forming the step members (33), the edge covers (7) are prolonged and form the fastening ends (26), the contour of which matches that of the corresponding front edge (19).

When articulated union between two panels is to be achieved, there are placed, between the corresponding front edges (19) of the union, on each side, an appropriate number of plates (23) provided with the pair of holes (29) that will accommodate the respective screws (25) by means of which the edge covers (7) of each panel (1, 2a, 2b) are secured.

In accordance with the preferred configuration of the panels (1, 2a, 2b), when the learning station is constituted, the front edges (19) of the end panel (2a), the intermediate panel (2b) and the vertical panel (1a) would be positioned as shown in FIGS. 6, 7 and 8, in order to permit the panels (2a) and (2b) to fold up with faces with which they rest on the table (4) against each other and for the panel (26) to fold up with its channeled active surface facing that of the vertical panel (1a), these being the folds which must take place in order for the learning station to be folded up.

In FIG. 9 one can clearly grasp the constitution of the hook (16) and its arrangement with respect to the vertical panel (1a), and it should be pointed out that owing to the possibility of sliding this hook (16) and its ability to be located in one or another of the channels (30), its use is always compatible with any configuration of the technological operating circuits.

FIGS. 10 to 15 illustrate the sequence of the operation of hooking the panels (2b) and (1a) which can be carried out at the end of the folding of the learning station. In the first movement of the operation, once the panels (2b) and (1a) have had their faces brought together, the panel (2b) is elevated until (FIG. 11) the edge of the corresponding hooking strip (9) extends beyond the extremity of the bent arm (32) of the hook or hooks (16) existing on the vertical panel (1a), so that the said bent arm (32) is situated facing the corresponding channel (30). The second movement consists simply in bringing the panel (2b) close to (1a) in order for the bent arm (32) to penetrate into the said channel (30), whereupon it suffices to lower the panel (2b) in order for hooking to take place (FIG. 14) with respect to the said strip (9). The relative vertical movement of the two panels (2b) and (1a) is permitted by the possible play of the articulation plate (23), as one can see by looking at FIGS. 12 and 15.

By means of this simple arrangement it is possible to maintain the folded position of the station, due to the fact that the panel (2a), owing to its own weight, will remain vertically positioned up against the already fastened panel (2b). In the event that there should exist a new articulated panel at the free transverse edge (19) of the panel (2a), using the same system described above it would be possible to suspend the new panel with respect to hooks (16) placed on the panel (2a).

When one wishes to extend the learning station anew, it will suffice, obviously, to carry out the operation described in reverse.

This being a sufficient description of the nature of the present invention, as well as of its industrial realization, it need only be added that it is possible within the scope of the invention to introduce changes of form, material and arrangement in the whole and the constituent parts thereof, provided that such changes do not alter its foundation.

I claim:

1. A foldable learning station for making up technological operating circuits, characterized in that it comprises an L-shaped structure formed by vertical (1) and horizontal (2) planes each made up of identical panels united by hinging means which enable the whole assembly to be folded by folding each panel up against the one adjacent to it, the said vertical plane (1) having placed against it at least two rear tubular posts (5) united at the top by hollow longitudinal members (6) and fastening means (8) at the bottom for securing the posts (5) to a horizontal base (4) supporting the horizontal work plane (2), which posts (5) and horizontal base (4) taken together permit the rigid securing of the L-shaped configuration, the said panels having work surfaces channeled in their totality which determine hooking strips (9) that permit the mounting of bridge-shaped modular supports (10) having a transverse plate (12) which in turn serves as a support for components (13) such as motors, tubes, resistors and the like, destined to make up technological operating circuits of the mechanical, electrical, electronic and fluid types; the U-pieces (11) of the bridge supports (10) also have hooking means at the bottom and sides which make it possible for the supports (10) to be assembled, at will, either individually or stacked on the work planes (1) and (2) and with their transverse plates (12) oriented either horizontally or vertically; and there also exist auxiliary panels (3), which can be mounted between two supports (10); all of which results in a foldable and transportable learning station which, in order to be installed, simply requires a horizontal base (4) and which makes it possible to obtain a multitude of possible configurations of the said technological operating circuits.

2. A foldable learning station for making up technological operating circuits, according to claim 1, characterized in that each channeled panel is constituted by a parallel array of identical T-shaped structural members that are uniformly separated and united with one another at their base; the upper crosspieces of the T-shaped structural members constitute the hooking strips (9) whose longitudinal borders project over the channels (30) separating them and the said T-shaped structural members have hollow shafts (21) which are widened at the base, by which they are united to the adjacent T-shaped structural members.

3. A foldable learning station for making up technological operating circuits, according to claim 2, characterized in that the bottom hooking means of the bridge supports (10) consist in having the U-pieces (11) of the supports (10) allow a certain elastic play in the distance separating them and in having the U-pieces (11) have, at their extremities, linking concavities (14) facing one another, between which a plate of another support (10) or a number of hooking strips (9) can be fitted, which linking concavities (14) are delimited between pairs of internal projections which prevent passage between the U-pieces (11), the outermost of these internal projections being capable of being separated by the elastic play of the U-pieces (11), while the other, innermost projections act as stops to prevent penetration once the linking of the concavities (14) has been achieved; and that, on the other hand, the lateral hooking means consist in having at least one of the U-pieces (11) have, on its exterior, longitudinal outward projections (15) between which hooking strips (9) can be fitted, the said outward projections (15) also permitting a certain elastic play in the distance separating them, which has to be overcome in order to produce hooking and unhooking.

4. A foldable learning station for making up technological operating circuits, according to claim 3, characterized in that in relation to the position of the user, the two frontal edges (19) of each panel are closed and have cross sections that form rounded areas symmetrical with one another, while on the two open lateral edges (20) of each panel there exist corresponding edge covers (7) having orifices (22) at their extremities, located opposite corresponding sockets (24) provided in the cross section of the panel concentrically with the respective symmetrical rounded areas, which orifices (22) and sockets (24) cooperate with an appropriate number of screws (25), there being lateral articulation members (23) which have a pair of holes (29) spaced at a distance slightly greater than the diameter of the said symmetrical rounded area, so that each of said holes (29) may receive a screw (25) for uniting two different panels.

5. A foldable learning station for making up technological operating circuits, according to claim 4, characterized in that provision is made for the hollow longitudinal members (6) to have fluid taps (17) and electrical outlets (18) conveniently located for feeding the circuits to be constituted on the station and that the corresponding supply lines may be channeled through the inside of the hollow longitudinal members (6) and the tubular posts (5).

6. A foldable learning station for making up technological operating circuits, according to claim 5, characterized in that there exist hooks (16) formed by a sliding plate (31) capable of running along the channel (30) between two contiguous hooking strips (9) and by a bent arm (32) that arises from the said sliding plate (31) and passes between the edges of the said two contiguous strips (9) so that its extremity rests against the edge of one of the said hooking strips (9), whereby, if on a panel in the vertical position hooks (16) are placed with their bent arms (32) pointing up, it is possible to hook another panel, folded back with its active face against the first, to the latter on a homologous strip (9) by subjecting the second panel to a simple first ascending movement and then a movement of approximation to the first panel, so that the folding of the said second panel will result in hooking that will hold the two panels united until the opposite maneuver is made, such movements being permitted by the possible play of the lateral articulation members (23).

7. A foldable learning station for making up technological operating circuits, according to claim 6, characterized in that in a preferred embodiment the front edges (19) have profiles symmetrical with one another of a breadth equivalent to the half the width of a hooking strip (9) and each of the said symmetrical profiles is constituted by a straight portion (28) located at right angles to the flat faces of the panel and by another, circular, arched portion (27) which is at the same time tangent to the said straight portion (28) and to the other face of the said panel, wherein between two mutually articulated panels at least one of the said panels will have its arched portion (27) facing in the direction in which folding must take place for folding up the station, it being the case that, when the two articulated panels belong to the same working plane, their union takes place in such a way that their front edges (19) end up with their straight portions (28) on top and facing one another, whereby the two terminal half-strips of both front edges (19) abut on the work surface, producing the esthetic effect of continuity of the channeled surface.

8. A foldable learning station for making up technological operating circuits, according to claim 7, characterized in that in a preferred embodiment the front edges (19) exhibit a perfectly semicircular section, in which case the coplanar union of the two panels will not produce the esthetic effect of continuity of the channeled work surface, inasmuch as the upper circular quadrants of the said front edges (19) will be visible on it.

9. A foldable learning station for making up technological operating circuits, according to claim 8, characterized in that in a preferred embodiment the L-shaped structure of the station is made up of two horizontal panels, one being an end panel (2a) and the other an intermediate panel (2b), and by a vertical panel (1a), all of them rectangular, the mutually articulated front edges (19) of the said horizontal panels (2a) and (2b) having their respective arched portions (27) facing one another and directed toward the bottom where they are folded when the station is folded up, whereas in the articulation of the intermediate (2b) and vertical (1a) panels the arched portion (27) of the intermediate panel (2b) is directed upward, facing the flat face of the vertical panel (1a) which, on the said front edge (19) thereof, will be located opposite the corresponding arched portion (27), wherein it is on the vertical panel (1a) that the sliding hooks (16) are located which, when the station is folded, make it possible to hook the intermediate horizontal panel (2b) on which the end horizontal panel (2a) rests by virtue of its own weight, so that the station can be maintained in the folded position while it is not being used.

10. A foldable learning station for making up technological operating circuits, according to claim 9, characterized in that, preferably, the number of tubular posts (5) is two, as is the number of hollow longitudinal members (6).

11. A foldable learning station for making up technological operating circuits, according to claim 10, characterized in that, preferably, the articulation members are plates (23) positioned laterally on the outside of the panels.

12. A foldable learning station for making up technological operating circuits, according to claim 11, characterized in that, preferably, the edge covers (7) each have an appropriate number of fastening ends (26) for fastening to the panel which are formed as a longitudinal prolongation of the lateral face of the said edge covers (7).

13. A foldable learning station for making up technological operating circuits, according to claim 12, characterized in that, preferably, on the lateral face of the edge covers (7) there exist an appropriate number of recessed end step members (33) starting from which there are formed longitudinally the corresponding fastening ends (26), which step members (33) have a height equivalent to the thickness of the articulation plates (23) in order that, when the edge covers (7) are mounted, the said plate (23) are laterally flush with the edge covers (7).

* * * * *